United States Patent [19]
Prescott et al.

[11] Patent Number: 5,840,355
[45] Date of Patent: Nov. 24, 1998

[54] FLOWER ARRANGEMENT INCLUDING A CONFECTIONERY PRODUCT AND A GREETING CARD

[75] Inventors: Thomas B. Prescott, Saline; Marc S. Margolis, Ann Arbor, both of Mich.

[73] Assignee: The King Group, Inc., Ann Arbor, Mich.

[21] Appl. No.: 741,523

[22] Filed: Oct. 31, 1996

[51] Int. Cl.⁶ .............................. A23L 1/00; B65D 65/00
[52] U.S. Cl. ........................ 426/104; 426/87; 426/132; 40/771; 40/772; 40/790; 40/725; 40/647; 40/649; 47/48.5; 206/232
[58] Field of Search .......................... 206/232; 426/104, 426/87, 132; 42/48.5; 40/771, 772, 790, 725, 647, 649

[56] References Cited

U.S. PATENT DOCUMENTS

| | | |
|---|---|---|
| 4,393,622 | 7/1983 | Gallo, Sr. . |
| 4,608,302 | 8/1986 | Schirmer . |
| 5,358,114 | 10/1994 | Neugebauer . |
| 5,579,905 | 12/1996 | Ingber et al. . |

*Primary Examiner*—Christina Y. Chan
*Assistant Examiner*—Martha Lubet
*Attorney, Agent, or Firm*—Harness, Dickey Pierce, P.L.C.

[57] ABSTRACT

A confectionery product that also functions to transmit a greeting or a message to a person receiving the product. The product comprises a rectangular bar of chocolate candy having a top surface provided with a cavity. A wrapper enclosing the candy bar and extending into the cavity is in turn encircled by a tubular heat shrink member. The heat shrink member is in firm engagement with the wrapper that provides access to the cavity so that the greeting card can be personalized and then inserted in one end of the heat shrink member and pushed to a position in the cavity. The resulting product can then be displayed in a flower arrangement or used by itself.

4 Claims, 1 Drawing Sheet

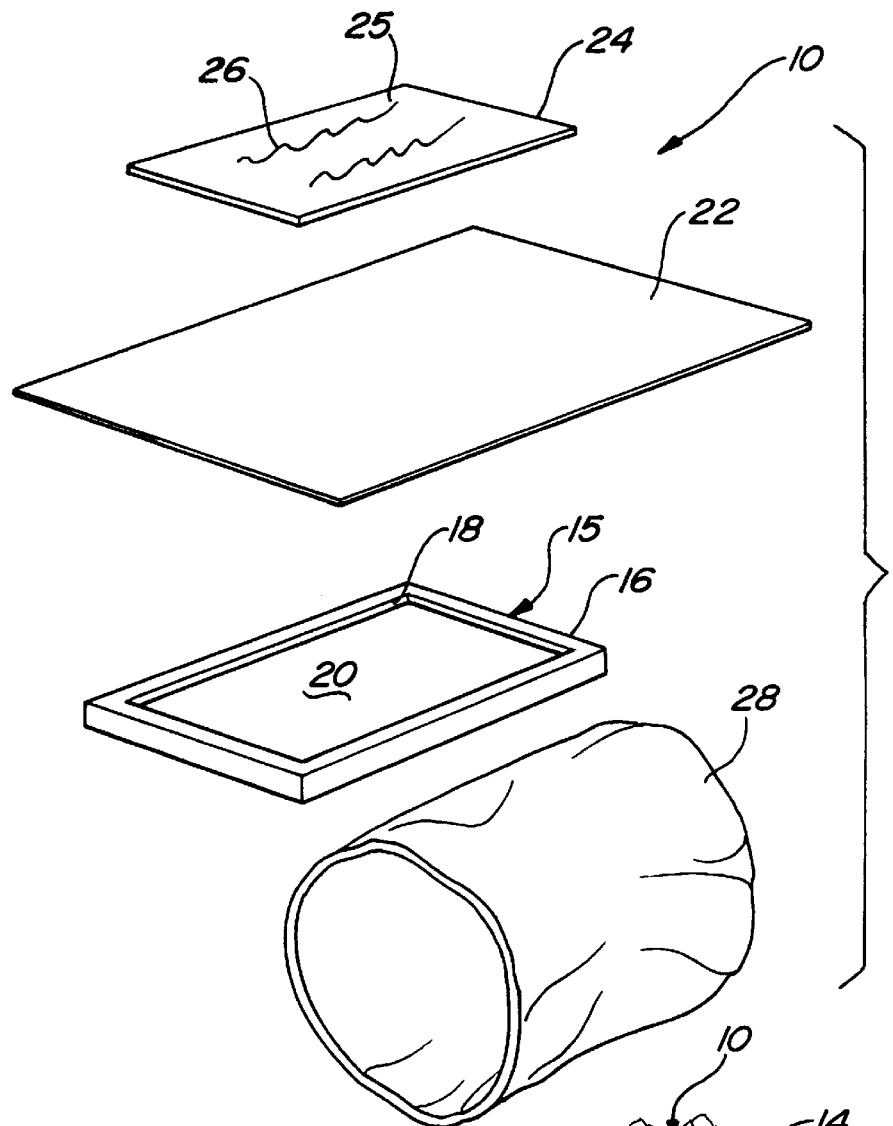
*Fig-1*
*Fig-3*
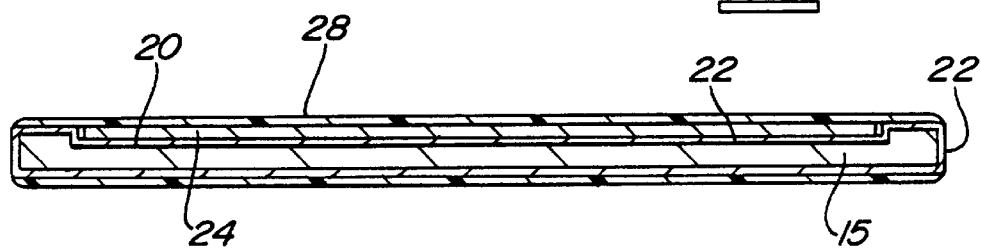
*Fig-2*

FLOWER ARRANGEMENT INCLUDING A CONFECTIONERY PRODUCT AND A GREETING CARD

BACKGROUND OF THE INVENTION

This invention relates generally to the field of gift giving and more particularly to a confectionery product which carries a greeting card and can operate to enhance any gift product particularly a flower arrangement.

The practice of gift giving is widening, and as a result, there is a great effort to enhance gifts such as flower arrangements and greeting cards which dominate the practice.

SUMMARY OF THE INVENTION

This invention provides a confectionery product that also functions to transmit a message to a person receiving the product. The product consists of a shaped bar of candy, preferably chocolate, having a top surface provided with a rectangular cavity. A wrapper member encloses the candy bar and extends into the cavity. The wrapper member is preferably made of foil and it completely covers and encloses the candy bar. A tubular heat shrink member encircles the bar and the wrapper member, with the shrink member being shrunk to a position in firm engagement with the wrapper member and extending over the cavity. A greeting card is then readily assembled with the candy bar by inserting the greeting card through one end of the tubular shrink member and depositing the greeting card in the cavity so that the greeting card is confined between the shrink member and the foil wrapper. The shrink member is transparent to enable examination of the card without removing it from its position between the candy bar and the shrink member.

A conventional holder member of straight stick configuration is supported in a flower vase member in a position in which it extends above the flower vase. The confectionery product is then hung on the holder member so that the product is artistically displayed with the flowers.

The combination of the vase, the flowers, the confectionery product and the greeting card provides a unique gift that enhances the importance of the flowers, the candy bar, and the greeting card.

Further objects, features and advantages of the invention will become apparent from a consideration of the following description and the appended claims when taken in connection with the accompanying drawings.

BRIEF DESCRIPTION OF THE DRAWINGS

FIG. 1 is an exploded perspective view of the confectionery product of this invention;

FIG. 2 is an enlarged longitudinal sectional view of the confectionery product shown in FIG. 1; and FIG. 3 is an elevational view of a flower arrangement including the confectionery product shown in FIG. 2.

DETAILED DESCRIPTION OF THE PREFERRED EMBODIMENT

With reference to the drawing, the confectionery product of this invention, indicated generally at 10, is shown in FIG. 1 in combination with a flower vase 12 supporting an arrangement of flowers 14. As shown in FIG. 1, the confectionery product 10 comprises a shaped bar 15 of candy, illustrated as being generally rectangular in shape. The bar 15 has a top surface 16 provided with a cavity 18 which has a flat rectangular floor or bottom surface 20. A wrapper member 22, preferably of metal foil or the like, which, as shown in FIG. 2, is wrapped around the bar 15 so as to fully enclose the bar 15.

The cavity 18 is shaped and dimensioned so as to enable it to receive a greeting card 24 which is in the form of a flat cardboard member. The greeting card 24 on its top surface 25 has imprinted a suitable message indicated diametrically at 26. A tubular member 28, formed of transparent heat shrink material, is telescoped over the candy bar 15 after it has been wrapped with the wrapper 22. The tubular member 28 is longer than the length of the cavity 18 but is slightly short of being exactly as long as the candy bar 15 to enable the card 24 to be slipped into the space at one end of the bar 15 between the wrapper 22 and the heat shrink member 28. In its final assembled position, the card 24 rests on the wrapper 22 above the floor 20 of the cavity 18 in a position inside the tube 28. The message 26 is readily readable because the heat shrink member 28 is transparent.

The confectionery product 10 is readily producible in large numbers because of the fact that there are few components. The candy bar 15 is readily wrapped with the wrapper 22 and the shrink tube 28 is readily applied to the wrapped bar. The wrapped bars are provided at the flower shop along with greeting cards of standard shape and size corresponding to the shape and size of the cavity 18 in the bar 15. A customer can readily select a suitable greeting card, personalize the card, and then slip it into the slot at either end of the bar 15, between the wrapper and heat shrink 28 and move it to a position in which it drops into the cavity 18. The resulting assembly of candy bar and card can then be hung on a suitable holder 30 which is then applied to the vase 12 and the flower arrangement 14 shown in FIG. 3.

It is readily apparent that the addition of the confectionery product of this invention to the flower arrangement shown in FIG. 3 dramatically enhances the breadth of the gift represented by the flower arrangement. The confectionery product 10 is located in the arrangement in a position in which the recipient of the flowers is accustomed to seeing only a greeting card. The discovery of the confectionery product is intended to bring smiles to the face of the recipient and enhance the meaning of the greeting card when it is discovered that the greeting card is an integral part of the confectionery product. It is to be understood that the confectionery product 10 of this invention is readily applied to gifts other than flower arrangements, and can be used alone with the card 24 being, for example, a business card.

It is to be understood that the invention is not limited to the exact construction illustrated and described above, but that various changes and modifications may be made without departing from the spirit and scope of the invention as defined in the following claims.

We claim:

1. A confectionery product that also functions to transmit a message to a person receiving the product, said product comprising a shaped bar of candy having a top surface provided with a cavity having a bottom surface, a wrapper member enclosing said candy bar and extending into said cavity, a tubular heat shrink member encircling said bar and said wrapper member, said shrink member being in firm engagement with said wrapper member and covering said cavity, and a greeting card supported in said cavity on said bottom surface in a position between said wrapper and said shrink member.

2. The product according to claim 1 wherein said cavity is rectangular in shape and said shrink member is transparent to facilitate visual examination of the greeting card.

3. The product according to claim 2 wherein said bar is generally rectangular in shape and said card is also generally rectangular and of a size to fit in said cavity, said card being removably positioned in said cavity, said shrink member being of open ended tubular shape enabling said card to be removed from the bar through one of the ends of the shrink member.

4. In combination, a flower vase, flowers in the vase and extending upwardly therefrom, a confectionery product that also functions to transmit a message to a person receiving the product, said product comprising a shaped bar of candy having a top surface provided with a cavity, a wrapper member enclosing said candy bar and extending into said cavity, a tubular heat shrink member encircling said bar and said wrapper member, said shrink member being in firm engagement with said wrapper member and covering said cavity, and a greeting card in said cavity in a position between said wrapper and said shrink member and a holder for said confectionery product, said holder being in said vase and extending upwardly therefrom, said confectionery product being removably mounted on said holder at a position adjacent said flowers.

* * * * *